United States Patent [19]
Saari

[11] 3,881,397
[45] May 6, 1975

[54] METHOD AND TOOLING FOR CUTTING SIDE SEAL GROOVES

[75] Inventor: Oliver E. Saari, Chicago, Ill.

[73] Assignee: Illinois Tool Works Inc., Chicago, Ill.

[22] Filed: Dec. 17, 1973

[21] Appl. No.: 425,482

Related U.S. Application Data

[62] Division of Ser. No. 244,030, April 14, 1972, Pat. No. 3,786,702.

[52] U.S. Cl. .......................... 90/24.3; 83/5; 408/54; 144/136 R; 51/DIG. 32
[51] Int. Cl. ............................................. B23d 5/02
[58] Field of Search ......... 83/5; 408/54; 144/136 R; 90/11 C, 24 R, 89, 982, 24.3

[56] References Cited
UNITED STATES PATENTS
| | | | |
|---|---|---|---|
| 1,619,128 | 3/1927 | Jobst | 83/5 X |
| 2,677,313 | 5/1954 | Biegert | 83/5 |

*Primary Examiner*—Donald R. Schran
*Attorney, Agent, or Firm*—Robert W. Beart; Thomas W. Buckman

[57] ABSTRACT

The present invention relates generally to improvements in methods of and apparatus for forming longitudinal slots in the side surface of a rotor. More specifically, the present invention is directed to novel and practical methods and apparatus whereby longitudinal seal accommodating slots may be formed in the side wall of the rotor of a rotary internal combustion engine. An embodiment of the invention disclosed herein contemplates the use of reciprocable blade members having aligned slot cutting teeth along one marginal edge, the opposite margin of the blades being gripped within a reciprocable or oscillating blade holding device. Means is provided for securing the rotor in a fixed predetermined position with the side surfaces thereof being located in proximity to and in substantial parallelism with the aligned slot cutting teeth of a pair of spaced blades. Relatively short reciprocable synchronous strokes of the blades cause slots of predetermined depth to be formed simultaneously in each side surface of the rotor. The blades disclosed herein are arcuate in shape so as to produce corresponding arcuate slots in the side surfaces of the rotor.

8 Claims, 17 Drawing Figures

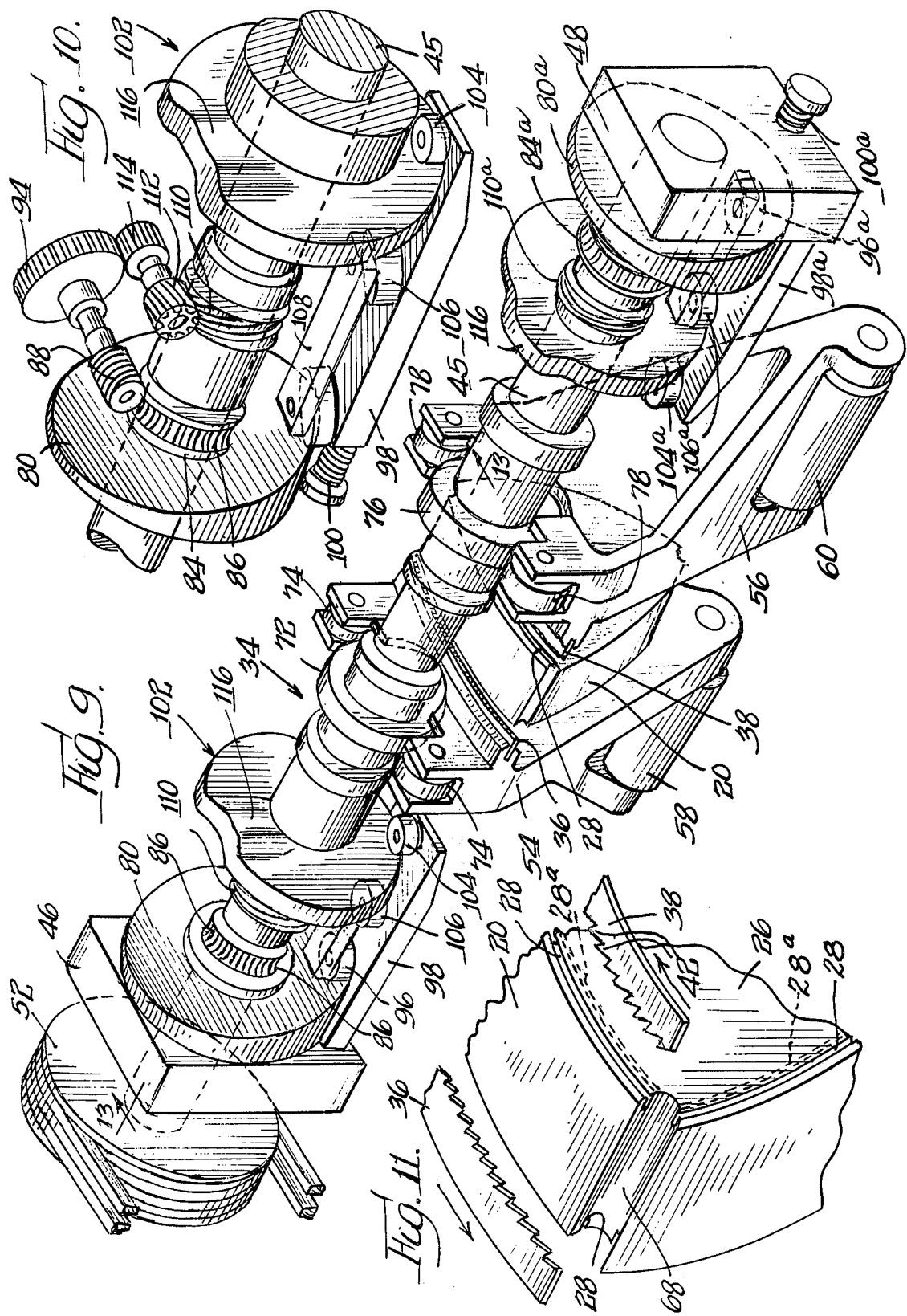

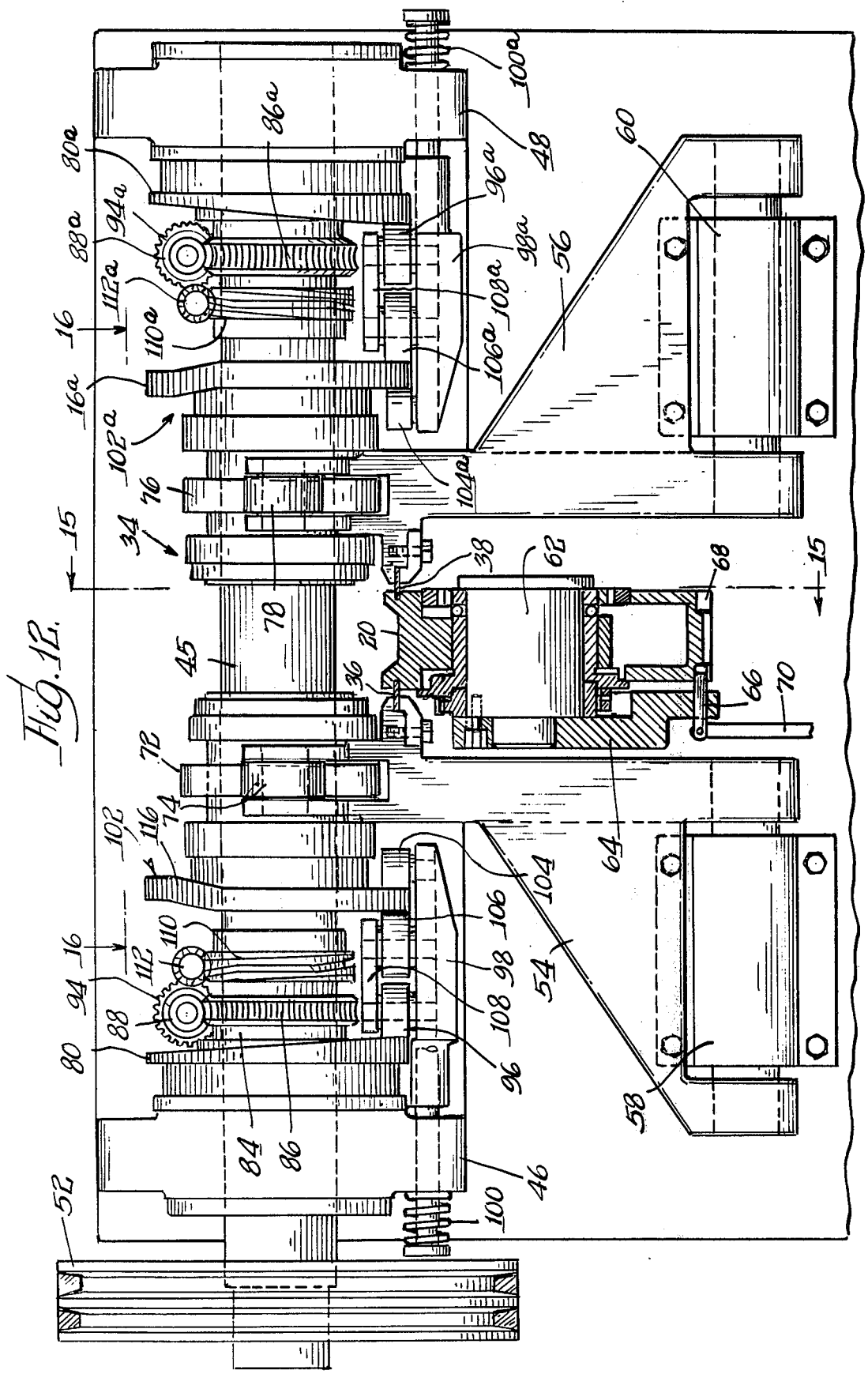

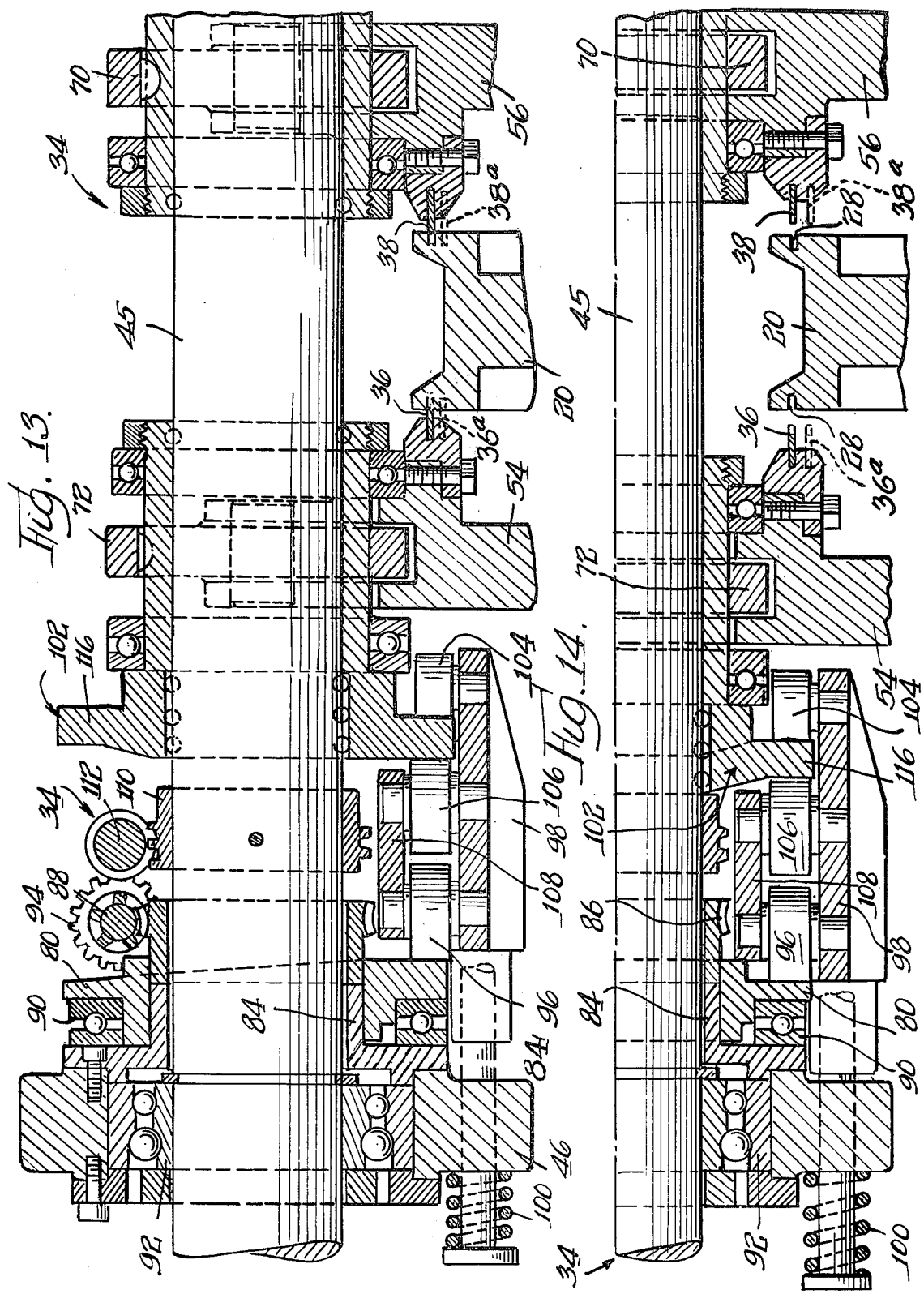

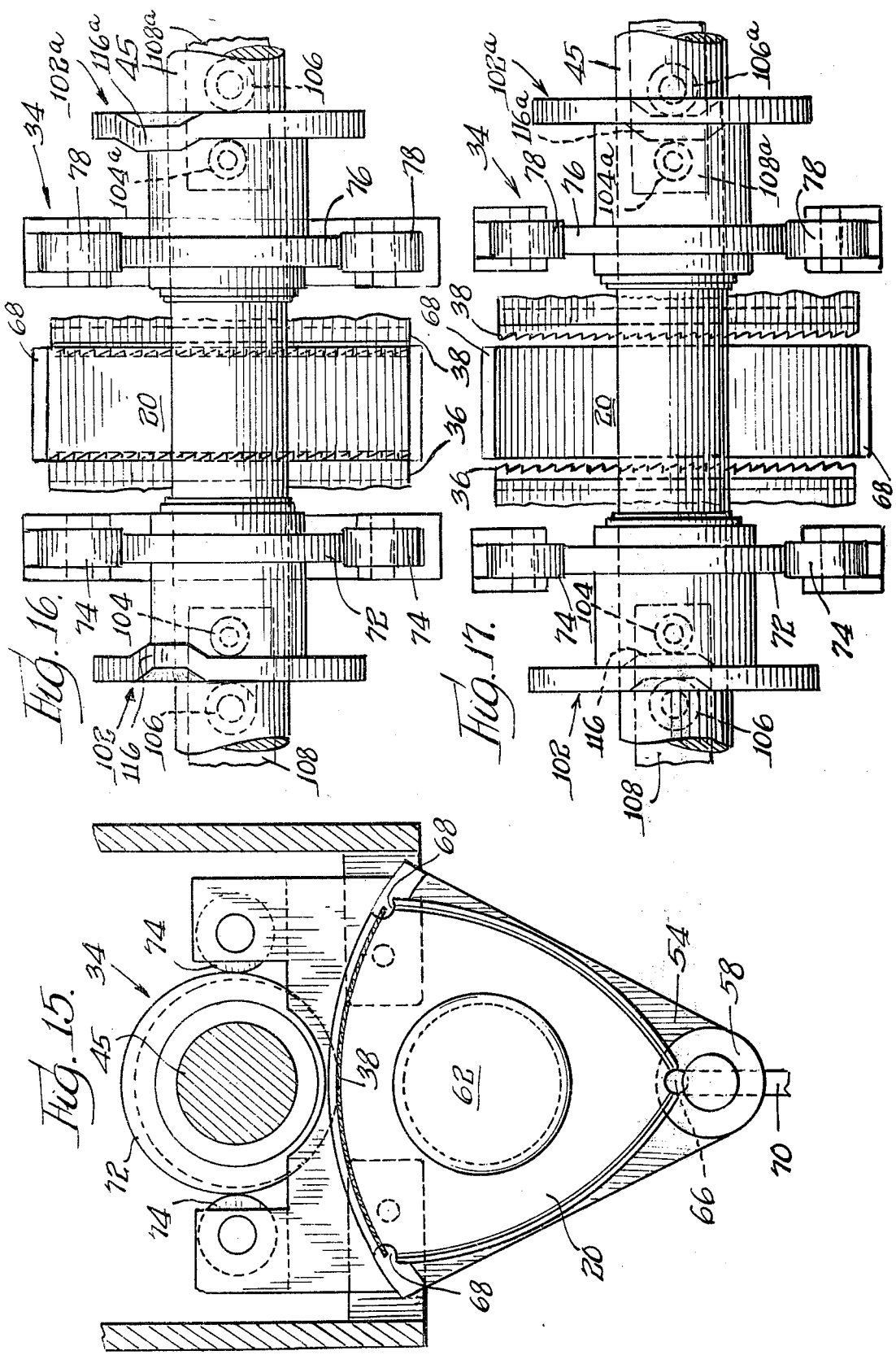

METHOD AND TOOLING FOR CUTTING SIDE SEAL GROOVES

This is a division of application Ser. No. 244,030 filed April 14, 1972, now U.S. Pat. 3,786,702.

SUMMARY OF THE INVENTION

There has been considerable publicity of late concerning internal combustion engines of the rotary type as distinguished from the conventional internal combustion engines incorporating reciprocating pistons, connecting rods, etc. The rotor of the rotary type internal combustion engines, as for example the rotor in the publicized Wankel RC engine, is generally triangular in shape with a sealing strip mounted at each vertex which is maintained in contact with the inner peripheral surface of the engine block or housing. This internal surface is epitrochoidal in shape, and thus the locus of every apex of the triangularly shaped rotor maintains continuous contact with that surface. The present invention is concerned primarily with the manner in which elongate seal accommodating slots are formed in the opposite side surfaces of the rotor. Such slots serve to accommodate sealing elements in the form of elongate strips which are yieldably held in sealing engagement with the adjacent inner surfaces defining the inner walls of the engine block. One of the problems incident to the manufacture of rotors of the type referred to above is that of efficiently producing the above mentioned elongate seal accommodating slots.

It is therefore one of the important objects of the present invention to provide improved methods and apparatus whereby such elongate seal accommodating slots may be produced economically with the required degree of accuracy.

In the rotor described and disclosed herein, the above mentioned side seal accommodating slots are arcuate in shape and this factor introduced a problem of manufacture which may be solved by following the teachings of the present invention.

More specifically, the present invention contemplates novel methods and apparatus for producing the above mentioned arcuate seal accommodating slots by employing a novel reciprocable tool arrangement whereby cutting action over the entire length of the rotor slot occurs simultaneously.

Still more specifically, the present invention contemplates improved and practical methods and apparatus whereby a novel arrangement of reciprocating cutting tools functions to produce three equally spaced seal accommodating slots in an exceedingly short period of time, the slots on one side of the rotor being formed contemporaneously with the formation of slots on the opposite side of the rotor.

The present invention further contemplates novel methods and apparatus whereby forces employed to perform the cutting operation are such as to maintain the equipment in dynamic balance at all times.

BRIEF DESCRIPTION OF THE DRAWINGS

The foregoing and other objects and advantages will be more apparent from the following detailed description when considered in connection with the accompanying drawings wherein:

FIG. 9 is a perspective view of the essential parts of a machine capable of contemporaneously forming elongate slots in opposite sides of the rotor surface for accommodating elongate side sealing members;

FIG. 10 is a fragmentary enlarged perspective view illustrating the mechanism for causing the cutter blade teeth to be urged or fed successively into cutting engagement with the side of the workpiece or rotor in small increments until a slot of predetermined depth has been formed;

FIG. 11 is a fragmentary perspective view illustrating the relative positions assumed by the rotor and blades for forming the seal accommodating slots in the opposed side surfaces of the rotor;

FIG. 12 is a front elevational view of the machine illustrated in FIG. 9;

FIG. 13 is a fragmentary sectional view taken substantially along the line 13—13 of FIG. 9, illustrating the position of the cams when the blades reach the limit of the successive advancement thereof;

FIG. 14 is a fragmentary sectional view disclosing the lower half of FIG. 13 to illustrate the position occupied by the cams after the seal accommodating slots have been completely formed and the cutting blades have been disengaged from the rotor;

FIG. 15 is a fragmentary vertical sectional view taken substantially along the line 15—15 of FIG. 12;

FIG. 16 is a fragmentary plan view of the mid-portion of the machine illustrated in FIG. 12 with the cutting blades occupying their deepest penetration into the side surfaces of the rotor, said view being taken substantially along the line 16—16 of FIG. 12; and FIG. 17 is a fragmentary plan view similar to FIG. 16 illustrating the cutting blades disengaged from the rotor.

DESCRIPTION OF A PREFERRED EMBODIMENT

Figure 1:
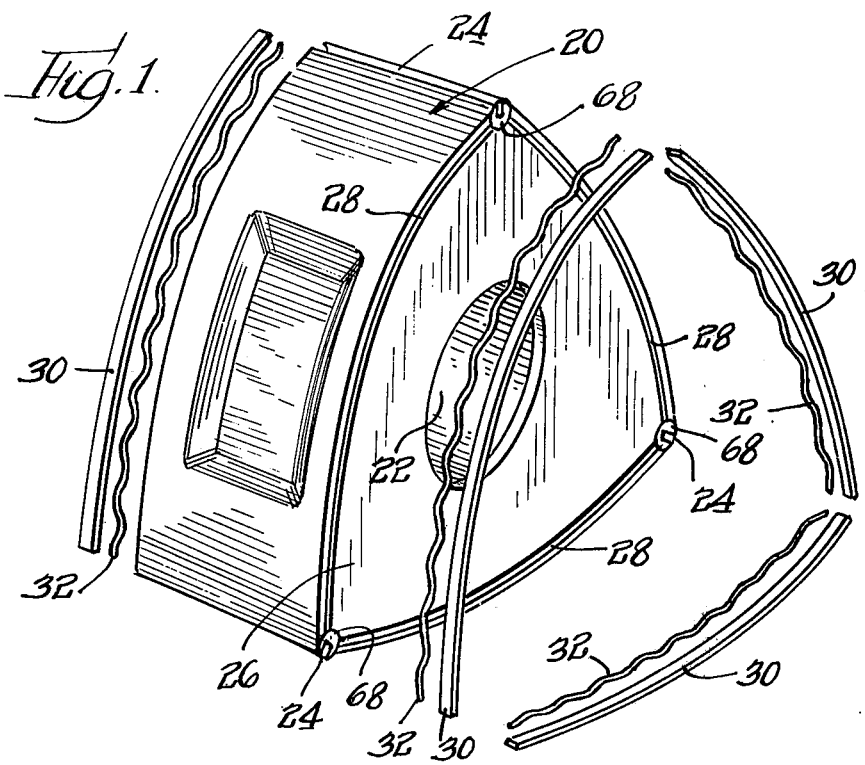
FIG. 1 is a perspective view of a rotor for rotary combustion engines with the elongate side sealing strips detached therefrom for purposes of clarity whereby to render visible the arcuate seal strip accommodating slots capable of being produced by following the teachings of the present invention.

Referring now to the drawings more in detail, wherein like numerals have been employed to designate similar parts throughout the various figures, it will be seen that FIG. 1 discloses a rotor 20 which is generally triangular in shape when viewed from the side thereof. A central aperture 22 is adapted to accommodate support means later to be described. The rotor 20 is of the type which, when in use, rotates within the confines of an engine block or housing (not shown). Axially extending slots 24 accommodate seal strips (not shown) at each vertex for sealingly engaging a surface of epitrochoidal configuration provided within the engine block. Each extremity or side surface 26 of the rotor 20 is provided with three identical and uniformly distributed arcuate slots 28 for accommodating complementary elongate seal strips 30. In FIG. 1 these seal strips are shown detached from the rotor, together with elongate spring elements 32.

In FIG. 9, and in FIGS. 12 to 17, inclusive, a machine designated generally by the numeral 34 is disclosed which is representative of one embodiment employed to form the previously mentioned arcuate slots 28 on opposite sides 26 of the rotor 20. It is believed, however, that before undertaking a detailed description of the machine 34, the method contemplated by the present invention may be more readily understood by reference to FIGS. 2 to 7, inclusive, and FIGS. 11 and 15. It will be observed from FIG. 11 that the present invention contemplates the use of elongate blade members 36 and 38, located on opposite sides of and adjacent to the rotor 20 which is in a fixed position. The work engaging edge of the blade 36 is provided with a plurality of cutting teeth 40 and the blade 38 is provided with a plurality of similar but oppositely facing teeth 42. It will be apparent that if the blades 36 and 38 are moved toward each other into engagement with the complementary side surface 26 of the rotor 20 and subjected to a stroke indicated by the directional arrows in FIG. 11, the initial formation of the arcuate slots 28 will occur. After the teeth of the blades 36 and 38 have been moved a distance slightly greater than the pitch of the teeth, said blades must be withdrawn sufficiently to clear the work surface, shifted reversely, and again moved into cutting relation. If this cycle of movement is rapidly repeated and the blades are moved in small increments into the work surface during each cycle of reciprocation, the slots 28 may be completed during a relatively brief time interval.

Figure 2:
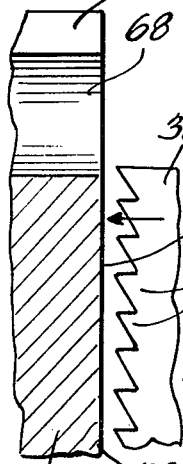
FIGS. 2 to 6, inclusive, are fragmentary illustrations depicting the relative positions of the slotting blade during one complete orbit or cycle of reciprocation thereof.
Figure 3:
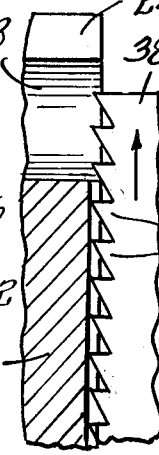
Figure 4:
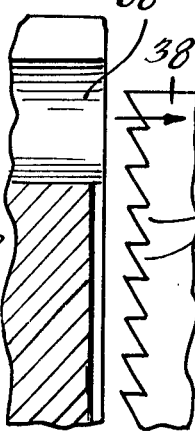
Figure 5:
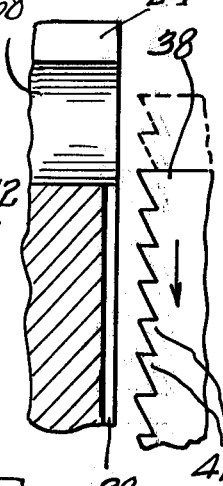
Figure 6:
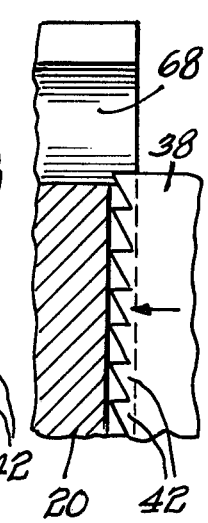

In FIGS. 2 to 7, inclusive, a semi-diagrammatic representation of this cutting cycle is disclosed. Only a portion of the rotor 20 and a portion of the cutting blade 38 is shown. In FIG. 2, the blade 38 is being shifted toward the side or face 26 of the rotor 20, as indicated by the directional arrow. FIG. 3 discloses the blade 38 moving in the direction indicated by the arrow, so as to partially form the slot 28. In FIG. 4, the blade 38 is shifted to the right, as indicated by the directional arrow, sufficiently to disengage the teeth from contact with the bottom of the previously partially formed slot. In FIG. 5, the blade 38 is shifted to the original position, illustrated in FIG. 2, in readiness to again move into cutting engagement with the workpiece. This cycle of blade reciprocation is repeated rapidly until the required depth of the slot is obtained, at which time the blades 36 and 38 are shifted out of contact with the rotor surface. The rotor 20 is now in readiness to be shifted through one third of a revolution and secured in a fixed position in readiness to be acted upon by the blades 36 and 38 in the manner just described. Upon completion of the second slot, the rotor is again shifted through one-third of a revolution, secured in position, and a third slot 28 formed therein. The rotor 20 may then be removed and replaced by another rotor to be slotted.

Figure 7:
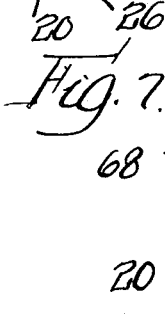
FIG. 7 diagrammatically illustrates the orbital path followed by the cutter blade during each cycle of reciprocation thereof.
Figure 8:
FIG. 8 is an enlarged fragmentary view illustrating the manner in which each side sealing member is resiliently biased by an elongate spring member to assure engagement of the sealing member edge with the adjacent inner wall of an engine block.

In FIG. 7, the orbital path of movement of the cutting blades 36 and 38 is indicated by a dot-and-dash line 44, FIG. 7. The exaggerated extent of movement of the cutter blades 36 and 38 as well as the length of the orbital path 44, has been purposely illustrated in order more clearly to understand the steps in the method contemplated by the present invention. From the foregoing it will be apparent that the present invention contemplates a method of forming elongate arcuate slots in the side surfaces of the rotor 20 by supporting said rotor in a predetermined fixed position, and thereafter subjecting the rotor side surfaces to relatively short successive longitudinal strokes of the blade teeth until a slot of predetermined depth has been formed in the rotor. It will also be apparent that by longitudinally shifting the elongate blades 36 and 38 in opposite directions, and in moving said blades toward each other during the cutting operation, forces counterbalance each other and as a result dynamic stability is maintained.

With the foregoing understanding of the method contemplated by the present invention, the details of the machine 34 which is representative of one mechanism whereby the method may be practiced will now be described. The apparatus or machine 34 includes a horizontal shaft 45 supported at each extremity by suitable frame members 46 and 48. The shaft 45 is rotated through the agency of a belt driven pulley 52, FIGS. 9 and 12. Positioned intermediate the extremities of the shaft and extending downwardly therefrom are axially spaced triangularly shaped arms 54 and 56 pivotally supported at the lower extremities thereof by suitable bearings 58 and 60, respectively. The bearings 58 and 60 are fixed to the machine frame as clearly illustrated in FIG. 12. A side view of the pivotally supported frame member 54 is best illustrated in FIG. 15. The previously mentioned cutting blade 36 is suitably mounted within the upper arcuate section of the frame 54, and the oppositely disposed blade 38 is similarly mounted within the upper extremity of the pivotal or tiltable frame 56. The frame members 54 and 56 are also axially shiftable within predetermined limits within their respective bearings 58 and 60, and are reciprocable at a rapid rate to impart relatively short strokes to the blades 36 and 38, as will hereinafter be more clearly set forth.

A stub shaft 62, FIGS. 12 and 15, accommodates and serves as a support for the rotor aperture 22, FIG. 1. The left extremity of the stub shaft 22, as viewed in FIG. 12, is carried by a fixed frame section 64. A horizontally slidable lock pin 66 is adapted to interlock with one of the three apex openings 68 of the rotor 20, in order to secure said rotor in a fixed position during the functioning of the previously mentioned slot forming blades 36 and 38. The axial shifting of the locking pin 66 may be controlled by a suitable lever 70, pivotally coupled therewith. With the rotor 20 secured in the position illustrated in the various Figs. the upper section of each side surface is located so as to be acted upon by the arcuately bent slotting blades 36 and 38, in the manner previously described.

Mechanism for causing each slotting blade to follow the orbital path shown in FIG. 7 will now be described. The blades 36 and 38 should be reciprocated at a high speed, as for example, at one thousand strokes per minute and the length of each stroke should be slightly greater than the pitch of the cutting teeth. Thus, for example, if the pitch of the cutting teeth 40 and 42 is approximately three-sixteenths one-fourth of an inch the cutting stroke of the blades may be approximately three-eighths of an inch. To accomplish the aforesaid rapid reciprocation of cutting blades, a cam member 72 driven by the shaft 45 coacts with rollers 74 carried by the frame member or arm 54 to impart rapid reciprocation to the blade 36. Likewise a cam member 76 coacts with rollers 78 to impart rapid reciprocation to the blade 38 supported by the frame or arm 56. The cam members 72 and 76 are so coordinated that as one of the blades moves in a given direction the other blade will simultaneously move in the opposite direction. In this manner forces required to impart the above-mentioned rapid reciprocation of the blades counteract each other and thus cooperate to maintain dynamic balance. Attention is also directed to the fact that the blades 36 and 38 do not at any period of the reciprocation thereof completely traverse the apex openings 68. The opposite extremities of the blades enter these apex openings 68 but do not engage the opposite wall defining said openings.

To perform the cutting stroke indicated by the upwardly directed arrow of the orbital path 44, FIG. 7, cutting teeth of the blades must be successively advanced in minute increments, as for example one thousandth (0.001) of an inch, into cutting engagement with the workpiece or rotor 20. This incremental advancement occurs during each non-cutting or reverse portion of a stroke of the blade as an incident to the functioning of rotatable cams 80 and 80a. In other words the increment of blade advancement does not occur during the cutting stroke thereof, but only during the period when the cutting extremities of the blade teeth are free from contact with the workpiece or rotor 20. The cam 80 rotates as a unit with a sleeve 84 having worm gear teeth 86 driven by a worm pinion 88. Thus the cam 80 rotates independently of the rotation of the shaft 45 and bears against a thrust bearing 90. As illustrated in FIG. 13 the sleeve 84 is supported at its left extremity by a ball bearing structure 92 mounted in the frame member 46. The worm pinion 88 is driven from a gear 94, FIG. 10. The feed cam 80a is mounted at the right extremity of the shaft 45 and functions in a manner similarly described with respect to cam 80. The driving elements associated with the cam 80a corresponding with the elements previously described in connection with the cam 80 are identified by like numerals bearing the suffix "a". The surfaces of the cams 80 and 80a bear against rollers 96 and 96a. These rollers 96 and 96a are rotatably supported upon horizontally shiftable carriages 98 and 98a respectively. The carriages 98 and 98a are shiftably supported by rods extending through respective frame members 46 and 48. The rollers 96 and 96a are constantly maintained in contact with their respective cam surfaces through the agency of coil springs 100 and 100a as clearly illustrated in FIGS. 12 through 14 inclusive. During each complete rotation of the cams 80 and 80a, the cutting blades 36 and 38 will experience a complete cycle of axial reciprocation. It is extremely important to control the cutting engagement of the blade teeth with the workpiece or rotor 20 in such a manner as to avoid the hazard of tooth impairment or breakage. The surfaces of the cams 80 and 80a are so designed that the blade teeth will not be brought into engagement with the rotor abruptly or suddenly, but will be properly directed into said engagement in such a manner as to assure smooth slotting action during each cutting stroke.

A cam or cam disc member 102 has a ball spline coupling with the shaft 45, thereby enabling the cam disc member 102 to be driven by the shaft and to be shifted longitudinally of the shaft within predetermined limits. A roller 104 mounted on the carriage 98 is constantly urged against the right or inner side of the cam member 102 by the previously mentioned coil spring 100. A complementary roller 104a supported by the carriage 98a is similarly urged against the inner surface of a second rotary disc cam member 102a as an incident to the yieldable action of the spring 100a. The outer sides of the cam discs 102 and 102a are engaged, respectively, by rollers 106 and 106a. The upper extremities of the rollers 96 and 106 may be connected by a member 108 as illustrated in FIGS. 12 to 14, inclusive. Likewise the rollers 96a and 106a may be connected by a member 108a. The cam disc 102 rotates between the rollers 104 and 106 and the cam disc 102a rotates between rollers 104a and 106a. It will be noted that the cam disc 102 is coupled with the frame arm 54 and the cam disc 102a is coupled with the frame arm 56. As will hereinafter be more clearly understood, the cam disc members 102 and 102a serve to control and assure successive travel of the blades 36 and 38 in the orbit 44 during each complete rotation of the cams 80 and 80a.

Attention is now directed to a no pitch or low pitch worm wheel 110 which is pinned to and thus rotatable with the shaft 45. This low pitch worm 110, as illustrated in FIG. 10, meshes with a worm wheel 112 of predetermined lead which in turn drives a pinion 114 meshing with the previously mentioned gear 94. In this manner the speed of rotation of the cam 80 is appreciably slower than the rotation of the cam disc 102. In fact several complete rotations of the cam discs 102 and 102a will occur during one complete revolution of their respective cams 80 and 80a. Cam disc 102 is provided with a high point cam section 116, which when in engagement with the roller 104 shifts the blade 36 to the left as indicated in FIG. 14. Thus the teeth of the blade 36, during this instant of the cycle of rotation, are free from engagement with the workpiece or rotor 20. However, when the diametrically opposed surface of the cam disc 102 is in engagement with the roller 104 as illustrated in FIG. 13, the cutting stroke of blade 36 is taking place. For purposes of illustration the extent of disengagement of the cutting edge of blades 36 and 38 from the rotor is exaggerated in FIG. 14. Thus, during each complete rotation of the cam disc 102, the cam 80 will experience a partial degree of rotation which, for example, may be sufficient to advance the cutting blades 36 about one thousandth of an inch.

It will be apparent from the foregoing that cam discs 102 and 102a, together with the springs 100 and 100a, function to insure positive and instantaneous disengagement of the cutter blade teeth 36 and 38 during the non-cutting portion of each cycle of orbital movement indicated by the dot and dash line 44 of FIG. 7.

As previously stated, the elements associated with the cam disc 102a are designated by corresponding numerals bearing the suffix a. It is important to note that the forces which cause the above described action function in opposition to each other so as to maintain the operating parts in dynamic balance. In other words, the blades 36 and 38 together with their supporting frame members move toward and away from each other simultaneously and said frame members move in opposide directions as they tilt about their common axes.

As previously mentioned, after each pair of oppositely positioned slots 28 has been completely formed in the rotor 20, by practicing the method described above, the locking pin 66 may be withdrawn and the rotor shifted one-third of a revolution and secured in a fixed position in order to complete the formation of another pair of arcuate slots. Likewise, the third pair of slots may be completed after the rotor has again been shifted through a third of a revolution and secured in position by the locking pin 66.

It will be understood from the foregoing description that the present invention contemplates improved, practical methods and apparatus whereby elongate recesses may be produced in the side surfaces of rotors and the like by engagingly penetrating to a predetermined depth over substantially the entire width of the rotor surface contemporaneously with a plurality of cutting teeth, as for example, the aligned cutting teeth of an elongate blade. The invention also contemplates improved and economical methods and apparatus for simultaneously forming elongate recesses on opposite sides of a supported rotor.

By practicing the above-defined methods elongate seal accommodating slots or recesses in rotors and the like may be produced very economically and with the required degree of accuracy. Obviously the present invention is not limited to the use of the apparatus described herein for practicing the above-mentioned methods, but contemplates other means whereby the aforesaid sequential steps may be practiced expeditiously, efficiently and economically.

The methods and apparatus heretofore described have been directed to the production of single slots 28 in the opposed side surfaces of the rotor 20. It should be understood that the present invention also contemplates the production of additional slots 28a as indicated by dotted lines in FIG. 11. This may be accomplished by simply employing additional blades 36a and 38a as shown by dotted lines in FIGS. 13 and 14. Hence the present invention is also directed to practical and efficient methods for simultaneously cutting during each orbital cycle a plurality of adjacent seal accommodating arcuate slots in the sides of a rotor.

As will be understood from the foregoing description the width of the slots or recesses 28 and 28a must be held to very close tolerances and the side surfaces defining said slots must be smooth and in absolute parallelism throughout the entire arcuate extent thereof in order to snugly accommodate the seal strips 30. Hence, the width of the teeth of said blades must be uniformly accurate at the cutting extremities thereof. It has been found advanntageous to provide the teeth with a predetermined degree of side clearance, in order to assure the required degree of accuracy in the width of the slots produced thereby.

I claim:

1. Apparatus for forming an elongate seal accommodating slot in the side surface of a rotor of a rotary type internal combustion engine including a longitudinally reciprocable elongate slotting blade having a series of cutting teeth provided along one marginal edge thereof, means for clampingly holding and retaining said blade so that the teeth are aligned along an arcuate path corresponding to the desired arcuate configuration of the seal accommodating slot, means for providing a limited oscillation of the clamping means and the arcuate aligned teeth about a predetermined center point and providing a cutting stroke and return stroke, cam means for providing an orbital path to the cutting teeth including means for retracting the cutting teeth from engagement with the workpiece after each predetermined limited cutting stroke along the arcuate path, means for advancing the cutting teeth to successively greater depths into the workpiece surface, means for supporting a rotor in a predetermined fixed position with a side surface thereof located in proximity to and in substantial parallelism with the cutting teeth of said blade.

2. Apparatus for forming an elongate seal accommodating slot as defined in claim 1, wherein the means for advancing the cutting teeth cause the teeth to be advanced only during the noncutting portions of the orbital path of the teeth.

3. Apparatus for forming an elongate seal accommodating slot in the side surface of a rotor of a rotary type internal combustion engine including a tool holding means for retaining a series of cutting teeth aligned along an arcuate path corresponding to the path of arcuate seal accommodating slot, cam means for causing the cutting teeth to perform a limited cutting stroke on the side surface of the rotor along the arcuate path, cam means causing the cutting teeth to successively enter and be retracted from the slot being cut, means to feed the tool holding means to successively increase the depth of cut of the cutting teeth.

4. The apparatus in accordance with claim 3, wherein the feed means operates to feed the tool holding means only during the period when the cutting teeth are retracted from contact with the slot.

5. Apparatus in accordance with claim 3, wherein the cam means for causing the cutting teeth to perform a limited cutting stroke and cam means causing the cutting teeth to enter the slot cooperate to cause the cutting teeth to follow an orbital path generally perpendicular to the side surface of the rotor with one portion of the path being the cutting stroke followed by withdrawal of the cutting teeth from the slot, return of cutting teeth along an arcuate path and re-entry of the cutting teeth into the slot.

6. The apparatus in accordance with claim 3, wherein the cutting teeth are positioned along a unitary blade-like cutting tool, said tool clamped in a tool holder mounted to oscillate for a limited degree of arc about a fixed center as well as to reciprocate toward and away from the rotor during each complete oscillation.

7. Apparatus for forming an elongate seal accommodating slot in the side surface of a rotor as set forth in claim 1, including a plurality of longitudinally reciprocable elongate slotting blades adapted to be positioned on opposite sides of a supported rotor, and means for imparting relative reciprocation of said blade and supported rotor in a manner to cause the blade teeth successively to be moved into cutting engagement with opposite side surfaces of a supported rotor.

8. Apparatus for forming an elongate seal accommodating slot as set forth in claim 7, wherein the means for imparting relative reciprocation to the blades and a supported rotor cause said blades to simultaneously move in opposite directions.

* * * * *